United States Patent
Nevolin

(10) Patent No.: US 12,447,611 B2
(45) Date of Patent: Oct. 21, 2025

(54) METHOD FOR DETERMINING THE DEFORMATION OF STRUCTURAL ELEMENTS OF A DELTA ROBOT

(71) Applicant: OOO "MOLODAYA, DINAMICHNO RAZVIVAUSHCHAYASYA KOMPANIYA", Moscow (RU)

(72) Inventor: Aleksandr Olegovich Nevolin, Moscow (RU)

(73) Assignee: OOO "Molodaya, Dinamichno Razvivaushchayasya Kompaniya", Moscow (RU)

(*) Notice: Subject to any disclaimer, the term of this patent is extended or adjusted under 35 U.S.C. 154(b) by 301 days.

(21) Appl. No.: 18/268,278

(22) PCT Filed: Nov. 1, 2021

(86) PCT No.: PCT/RU2021/050365
§ 371 (c)(1),
(2) Date: Jun. 19, 2023

(87) PCT Pub. No.: WO2022/131960
PCT Pub. Date: Jun. 23, 2022

(65) Prior Publication Data
US 2024/0058957 A1   Feb. 22, 2024

(30) Foreign Application Priority Data

Dec. 17, 2020 (RU) ................ 2020141902

(51) Int. Cl.
*B25J 9/00* (2006.01)
*B25J 9/16* (2006.01)

(52) U.S. Cl.
CPC .................. *B25J 9/1633* (2013.01)

(58) Field of Classification Search
CPC .............. B25J 9/1633; B25J 9/00; B25J 7/00
See application file for complete search history.

(56) References Cited

U.S. PATENT DOCUMENTS

2019/0275669 A1* 9/2019 Matsushita ............ B25J 9/0084
2022/0388154 A1* 12/2022 Gentili ..................... B25J 9/126

FOREIGN PATENT DOCUMENTS

| CN | 208946215 U | | 6/2019 | |
| CN | 111558954 A | * | 8/2020 | ............ B25J 15/00 |
| DE | 102019134209 A1 | * | 6/2021 | ............ B25J 9/0051 |
| SU | 1348171 A1 | | 10/1987 | |
| SU | 1719881 A1 | | 3/1992 | |

\* cited by examiner

*Primary Examiner* — Jamel E Williams
(74) *Attorney, Agent, or Firm* — Boyle Fredrickson S.C.

(57) ABSTRACT

The preferred embodiments relate to the field of measuring technology, and can be used to determine in-motion delta robot arm deformation. The method includes the use of a linear encoder, which is mounted on one side of the delta robot arm, and the shaft is attached to the other side of the arm, and the turning shaft is arranged with freedom of movement inside the linear encoder, and the delta robot arm deformation is determined during its motion by displacement of the said shaft inside the encoder relative to its initial position. The use of the invention enables to simplify the process of determining deformations.

5 Claims, 1 Drawing Sheet

METHOD FOR DETERMINING THE DEFORMATION OF STRUCTURAL ELEMENTS OF A DELTA ROBOT

BACKGROUND OF THE INVENTION

Field of the Invention

The invention relates to the field of measuring technology, in particular, to instruments for measuring in-motion only deformations of elements in the structure of devices, preferably a delta robot.

Description of Related Art

The prior art discloses a device for determining the axial position of the test object moving linearly along the roller system and simultaneously rotating in a spiral, which comprises a frame, a lever mechanism, a housing with rollers. Each roller is machined on a spherical surface with a radius R and mounted in a housing on bearings for rotation around its axis. Housings assembled with rollers are mounted on a chain put on sprockets in such a way that the turning shaft of each roller is parallel, and the turning shaft of the sprockets is perpendicular to the shaft of the test object, for example, a pipe; the dividing diameter of the sprockets is chosen such that the radius of the enveloping cylindrical surface of the rollers R1 is greater than or equal to the radius R of the roller processing, the support bar is mounted so that the tops of the rollers located between the sprockets are on a common tangent to the two enveloping cylindrical surfaces. In this case, several rollers are in contact with the test object. An angle-sensing transducer, such as an encoder, is mounted on the same shaft as one of the sprockets and rotates with the sprocket. Moreover, when the entire roller comes into contact with the test object, which moves not only axially, but also rotates, for example, on a roller system with rotary rollers, the encoder records only the axial displacement of the point of the test object, and the rotational displacement of the test object does not affect the axial coordinate measurement (RU 158847 U1, Jan. 20, 2016).

The prior art discloses a stand for verification of level gauges comprising fixed and movable parts with fixed bases on each of them, a distance meter from the movable part to the fixed part in the form of a measuring tape, a means of reading the indicators of the meter, and the fixed part the calibrated level gauge is rigidly fixed on the fixed part base, and the reflector is fixed to the movable part base, and the test level gauge is mounted in such a way that its horizontal axis is perpendicular to the plane of the reflector, there is a tool for moving the reflector in a horizontal plane along the fixed linear part of the stand, equipped with elements for immobilizing it at given points and including a movable part on which the base with the reflector is fixed, and guides for its displacement in the form of aluminum profiles fixed on supports and serving as a tray for laying the measuring tape, its tension provided by the load, and equipped with temperature probes, at the base of the fixed part of the stand there is a position sensor, and a linear encoder was used as a tool for reading the meter indicators (RU 140028 U1, Apr. 27, 2014).

The prior art discloses a draw cable position sensor of the hydraulic cylinder rod comprising a housing, a housing power drum with a central axis placed in the housing, with a cable wound on it, as well as a cable return mechanism in the form of coil springs and an encoder, and it is equipped with an additional measuring drum with which at least two turns of the cable wound on it, and the shaft of the measuring drum is connected on one side to the encoder, and on the other side to a worm reduction gearbox, at the end of the output spindle of which there is a dial with an arrow (RU 166504 U1, Nov. 27, 2016).

The closest to the presented technical solutions is a mobile robot, which comprises: a platform mounted on a vehicle, an obstacle detection device, a control system with a vehicle motion control unit and an obstacle detection device, a manipulator made in the form of geared and pivotally connected links pivotally mounted on the platform, with an obstacle detection device equipped with a movable probe and a position-sensitive sensor mounted on the end link. In addition, the vehicle motion control unit is plugged to a power supply unit connected to a series-connected microcontroller, a sixth amplifier and an electric drive, the inputs of the microcontroller are connected to the outputs of the sensors of current position, speed, angle- and linear sensing transducers, made in the form of encoders, their gears installed on each wheel of the vehicle (RU 2487007 C1, Jul. 10, 2016).

The main deficiency of these technical solutions is the complexity of their implementation, due to the need to use complex and expensive equipment.

SUMMARY OF THE INVENTION

The task to be solved by the present invention is the development of a method for determining in-motion only deformations of the structural elements of a delta robot, which would eliminate the aforesaid deficiencies.

The technical result to be accomplished in solving the above task is to create a highly efficient, publicly available and quick-to-implement method for determining in-motion only deformations of the structural elements of a delta robot, not involving the use of complex and expensive equipment for its implementation.

To accomplish this technical result, a method is proposed for determining in-motion deformations of the delta robot arm, wherein first a turning shaft is mounted on one side of the structural element, a linear encoder is mounted on the other side of the structural element; wherein the turning shaft is arranged with freedom of movement inside the linear encoder, after which the delta robot is engaged in motion, during which specifically any existing displacement of the said shaft inside the encoder relative to its initial position is determined. If this displacement is detected, a conclusion is made about the existing deformation of the structural element.

An arm of the robot can be used as a structural element in the method implementation.

These and other features and advantages of the invention will become apparent to those skilled in the art from the following description and the accompanying drawing. It should be understood, however, that the detailed description and specific examples, while indicating a preferred embodiment of the present invention, are given by way of illustration and not of limitation. Many changes and modifications may be made within the scope of the present invention without departing from the spirit thereof, and the invention includes all such modifications.

DETAILED DESCRIPTION OF THE PREFERRED EMBODIMENTS

The implementation of this method for determining the in-motion only deformation of the delta robot structural elements will be considered using the example of the deformation of the upper and lower arms of the delta robot.

The delta robot is a high-speed piece of equipment that moves using a carriage. Moreover, accelerations on the carriage can reach 15 g, i.e. during the motion of the delta robot, its arms (both upper and lower) are exposed to significant loads which result in their inevitable deformation. In this regard, this deformation needs to be promptly detected, since any existing deformation of the arms affects the pose accuracy, since slightly bent arm changes the geometry of the delta robot, and the position of the carriage will differ from the computed position.

First, for example, a shaft is attached to the upper arm on one side, and a linear encoder is mounted on the other side of the arm. The shaft and the linear encoder are set so that the shaft moves freely inside the linear encoder. In this setting, the encoder measures the shaft shift inside. After the required equipment is mounted on the upper arm of the delta robot, it is set in motion. Further, specifically during the motion the location of the shaft inside the linear encoder is determined. If during the motion the shaft inside the linear encoder moves, the arm is currently bent (deformed). If during the motion the position of the shaft inside the linear encoder remains unchanged, the arm is not currently deformed.

Next, a specific example of the method is given. In this regard, it is obvious to those skilled in the art that this example is given only as one of the embodiments of the proposed method and cannot be considered the only possible embodiment.

Assume that at the maximum acceleration of the robot, the arm is exposed to a bending force of about 50 N (if 3 arms carry a load of 1 kg with an acceleration of 15 g, this is 150 N in total, since there are three arms, it gives 50 N per arm).

Static tests show that exposure to this force can flex the arm up to 5 mm, and the required measurement accuracy or resolution is 0.5 mm.

Next, the encoder resolution is calculated, according to which one (1) encoder mark should be provided for such a linear displacement, which will give a bending of the lever by 0.5 mm.

For this purpose, this linear displacement (designated as Delta) should be calculated.

Figure 1:
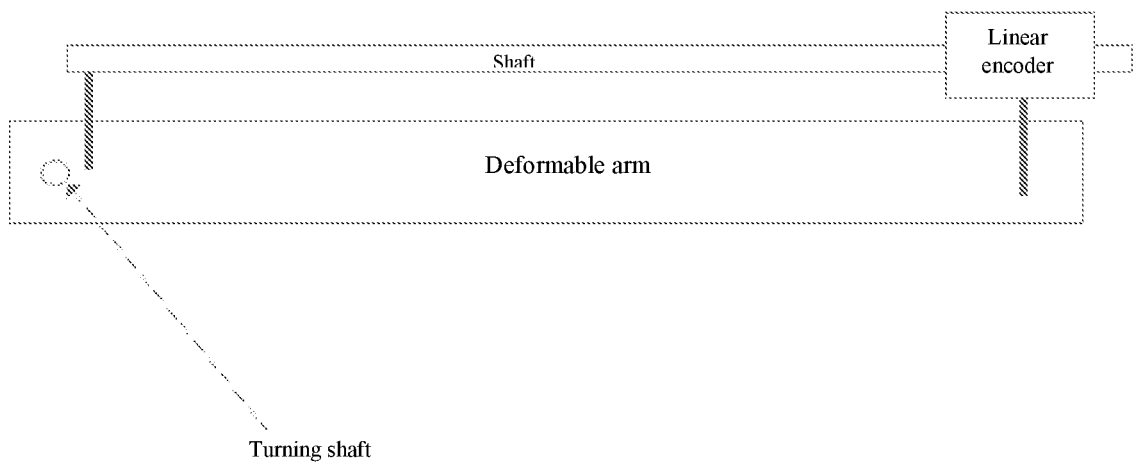
FIG. 1 shows a schematic representation of a device designed to implement the presented method for determining in-motion only deformations of the structural elements of the delta robot.
Figure 2:
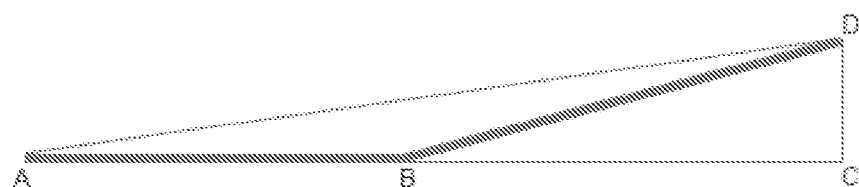
FIG. 2 shows a schematic representation of the robot arm.

Assume that the bent arm consists of 2 segments, AB and BD, the length of which is equal to and is half the arm length L (see FIG. 2).

Shaft displacement inside the encoder is the difference between L and AD. Therefore, the length of segment AD should be found.

CD (see FIG. 2) is known, as this is the required bending resolution of 0.5 mm.

According to the Pythagorean theorem:

$$BC = \sqrt{BD^2 - CD^2} = \sqrt{\left(\frac{L}{2}\right)^2 - CD^2}$$

Next, the length of AD is defined as the hypotenuse of triangle ACD.

$$AD = \sqrt{\left(\frac{L}{2} + BC\right)^2 + CD^2}$$

Since all components are known, the displacement of the Delta shaft inside the encoder is determined using the above formula:

$$Delta = L - AD$$

The sought-for value, the number of marks per mm of encoder displacement, will be equal to the reciprocal of 1/Delta.

All of the above confirms that this invention provides a highly efficient, publicly available method for determining the in-motion only deformation of structural elements of a delta robot, which does not involve the use of complex and expensive equipment to implement it.

The invention claimed is:

1. A method for determining in-motion only deformations of a delta robot arm, the method comprising:
   using indications of an encoder linked to the delta robot arm, and
   wherein a linear encoder is used as the encoder, which is mounted on one side of the delta robot arm, and a shaft is attached to the other side of the delta robot arm, and the shaft is arranged with freedom of movement inside the linear encoder, and the delta robot arm deformation is determined during its motion by displacement of the shaft inside the encoder relative to its initial position.

2. The method of claim 1, wherein a resolution of the deformation is less than 1 mm.

3. The method of claim 2, wherein a maximum acceleration of the delta robot arm is about 10 g, exposing the delta robot arm to a bending force of about 50 N.

4. The method of claim 3, wherein the resolution is about 0.5 mm.

5. The method of claim 1, wherein a number of indications per mm of encoder displacement will be equal to the reciprocal of 1/Delta, wherein Delta is the linear displacement which is dependent on a number of segments of the delta robot arm.

* * * * *